United States Patent
Haeusler

(10) Patent No.: US 8,787,301 B2
(45) Date of Patent: Jul. 22, 2014

(54) METHOD AND DEVICE FOR INTERFERENCE MITIGATION USING REDUNDANT TRANSMISSION IN SEPARATE ISM BANDS

(75) Inventor: Martin Haeusler, Ansbach (DE)

(73) Assignee: DSP Group Switzerland AG, Zürich (CH)

(*) Notice: Subject to any disclaimer, the term of this patent is extended or adjusted under 35 U.S.C. 154(b) by 2054 days.

(21) Appl. No.: 11/578,501

(22) PCT Filed: Apr. 11, 2005

(86) PCT No.: PCT/IB2005/051173
§ 371 (c)(1),
(2), (4) Date: Oct. 12, 2006

(87) PCT Pub. No.: WO2005/101756
PCT Pub. Date: Oct. 27, 2005

(65) Prior Publication Data
US 2007/0217455 A1    Sep. 20, 2007

(30) Foreign Application Priority Data
Apr. 16, 2004 (EP) .................................... 04101588

(51) Int. Cl.
*H04L 5/00* (2006.01)
*H04L 12/413* (2006.01)
*H04W 4/00* (2009.01)

(52) U.S. Cl.
USPC .......................... 370/330; 370/445; 370/338

(58) Field of Classification Search
USPC .................................................. 370/913, 330
See application file for complete search history.

(56) References Cited

U.S. PATENT DOCUMENTS

| 5,048,057 | A  * | 9/1991  | Saleh et al. ............... 375/267 |
| 5,926,501 | A  * | 7/1999  | Souissi et al. .............. 375/131 |
| 6,052,594 | A  * | 4/2000  | Chuang et al. ............. 455/450 |
| 6,587,498 | B1 * | 7/2003  | Sarkola ...................... 375/132 |
| 7,027,424 | B1 * | 4/2006  | Horvat et al. ............... 370/337 |
| 7,116,700 | B1 * | 10/2006 | Sivakumar .................. 375/132 |
| 2001/0048691 | A1 * | 12/2001 | Chang et al. ................ 370/442 |
| 2004/0037251 | A1 * | 2/2004 | Shneyour et al. ........... 370/336 |
| 2004/0038660 | A1 |  2/2004 | He et al. |

FOREIGN PATENT DOCUMENTS

EP          0 935 347           8/1999

* cited by examiner

*Primary Examiner* — Lester Kincaid
*Assistant Examiner* — Andy Gu
(74) *Attorney, Agent, or Firm* — Venable LLP; Michael A. Sartori

(57) ABSTRACT

A device for transmitting data packets over a data link, including an interference signal detector adapted to continually detect a frequency of interference signals on the data link, designator adapted to assign a first frequency channel and a first time slot on the data link, wherein the first frequency channels lies within a 2.4 GHz industrial scientific and medical (ISM) band, and adapted to assign a second frequency channel and a second time slot on the data link, wherein the second frequency channel lies within a 5.8 GHz ISM Band, transmitter adapted to transmit each data packet within the first time slot and the first frequency channel and within the second time slot and the second frequency channel, if the frequency of the interference signals lies within the 2.4 GHz or the 5.8 GHz band.

8 Claims, 2 Drawing Sheets

Figure 1:
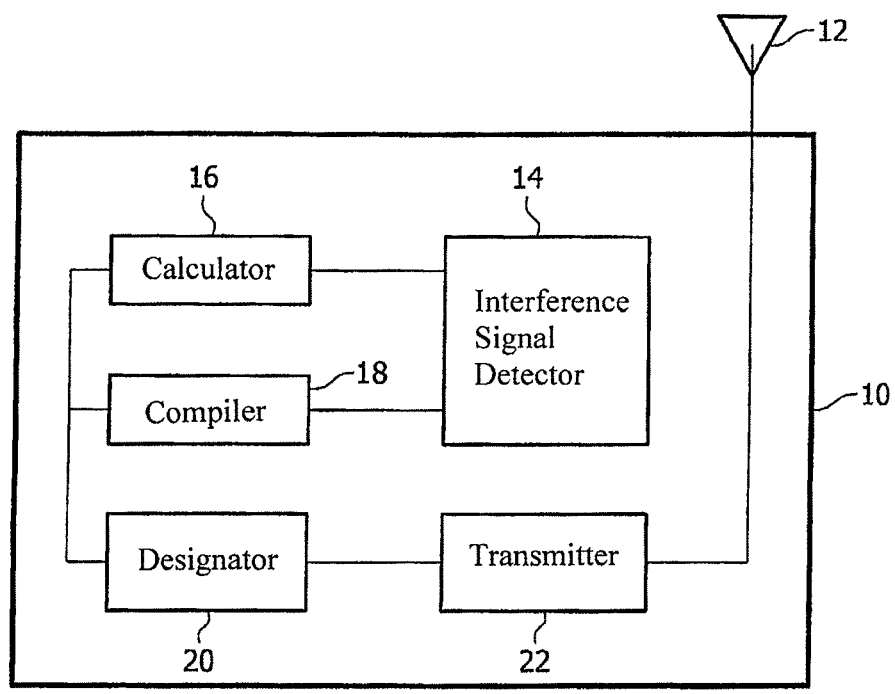

METHOD AND DEVICE FOR INTERFERENCE MITIGATION USING REDUNDANT TRANSMISSION IN SEPARATE ISM BANDS

The present invention relates to a method and device for transmitting data packets over a data link. Wireless communication has become more and more popular in the past few years. To this end companies are producing various portable and embedded information devices. These devices include PDAs, pagers, cellular phones or WLANs (wireless local area networks). Further wireless technologies include IEEE802.11, Bluetooth, IRDA and HomeRF. Due to its almost global availability the 2.4 GHz industrial scientific and medical (ISM) unlicensed band constitutes the popular frequency band suitable to low cost radio solutions. Hence, the 2.4 GHz ISM band is becoming more and more crowded. Further ISM bands are the 900 MHz and the 5.8 GHz ISM bands. The ISM bands are defined by the federal communications commission (FCC) for the United States.

Furthermore, it has been found, that microwave ovens emit high levels of electromagnetic radiation centered around the 2.4 GHz frequency range. Most radio technologies for data transmission operate in the 2.4 GHz ISM band. Since devices using the same frequency band may likely operate close together, this may lead to significant performance degradation. Prior art interference avoidance techniques include dynamic channel allocation. The frequency band is divided into plural frequency channels for data transmission. Interference between plural devices in the 2.4 GHz ISM band is avoided, if they transmit information across different channels in the 2.4 GHz ISM band. However, the increasing number of devices operating in the frequency band limits the effectiveness of these avoidance techniques. Unfortunately, the radiation transmitted by microwaves ovens spans the whole 2.4 GHz ISM band. Therefore this kind of interference will not be avoided by changing the frequency channel within the 2.4 GHz ISM band.

Recently, the 5.8 GHz ISM band is being used instead for data transmission. But it is foreseeable, that this band will also be congested in the near future.

Therefore, it is object to the present invention, to provide a method and device for transmitting data packets over a wireless data link that guarantees undisturbed data transmission.

The object is solved by the methods and devices according to the appended claims. Accordingly data transmission is performed in data packets. Time slots are assigned to the data links. The data packets are transferred within the assigned time slots. Furthermore the data transmission is carried out within the first ISM band and within the second ISM band. Both frequency bands are divided into several distinct frequency channels. A detector for detecting the frequency of interference signals on the data link is provided. Interference may be detected by counting the number of errors in a frequency channel. If the number of errors exceeds the predetermined value, then an interference signal with the frequency in the range of the frequency band may be detected. In case such interference is detected, the data transmission is carried out within both the first ISM band and the second ISM band. Since all known interference sources either transmit within the first ISM band or the second ISM band, the data packets transmitted in both bands will be transmitted undisturbed in one of the two bands. The crucial effect of the invention is that using a dual ISM band frequency diversity approach all possible interferers, which to our current knowledge operate only one of the ISM bands, can be avoided. If the information is transmitted twice, one time at a first frequency and the second time at a second frequency, it cannot be interrupted by an interferer, which transmits only in one of the bands.

Preferably, the duration of interference signals is detected and the average duration of the interference is calculated. The data packets are not only transmitted within two separate frequency channels but also within two separate time slots. The time slots are separated in time by a duration greater than the average duration of the interference signals. The likelihood of interference is further diminished by transmitting data packets during two separate time slots. If the time slots are separated in time by a duration greater than the typical duration of the interference signals, then one of the two time slots will most likely not be affected by an interferer. The transmission quality is thereby further enhanced.

Preferably a list of interfered frequency channels is created. The list comprises the frequency channels typically occupied by disturbing signals. If these disturbing channels are excluded from the channels provided for data transmission, then the transmission quality may further be enhanced. Therefore, one of the two frequency channels provided for transmitting the same data packet is chosen from the frequency channels not contained in the interference list.

If the data link is subject to periodic bursts of interference, then data transmission may be carried out in the following way: the periods between the subsequent interference signals is detected and the presumable time, when the next interference signals will occur is calculated. The time slots for data transmission are chosen such that they do not contain interference bursts.

Preferred embodiments of the present invention will be described with reference to the accompanied drawings.

FIG. 1 shows a device for transmitting data packets according to the preferred embodiment of the present invention.

Figure 2:
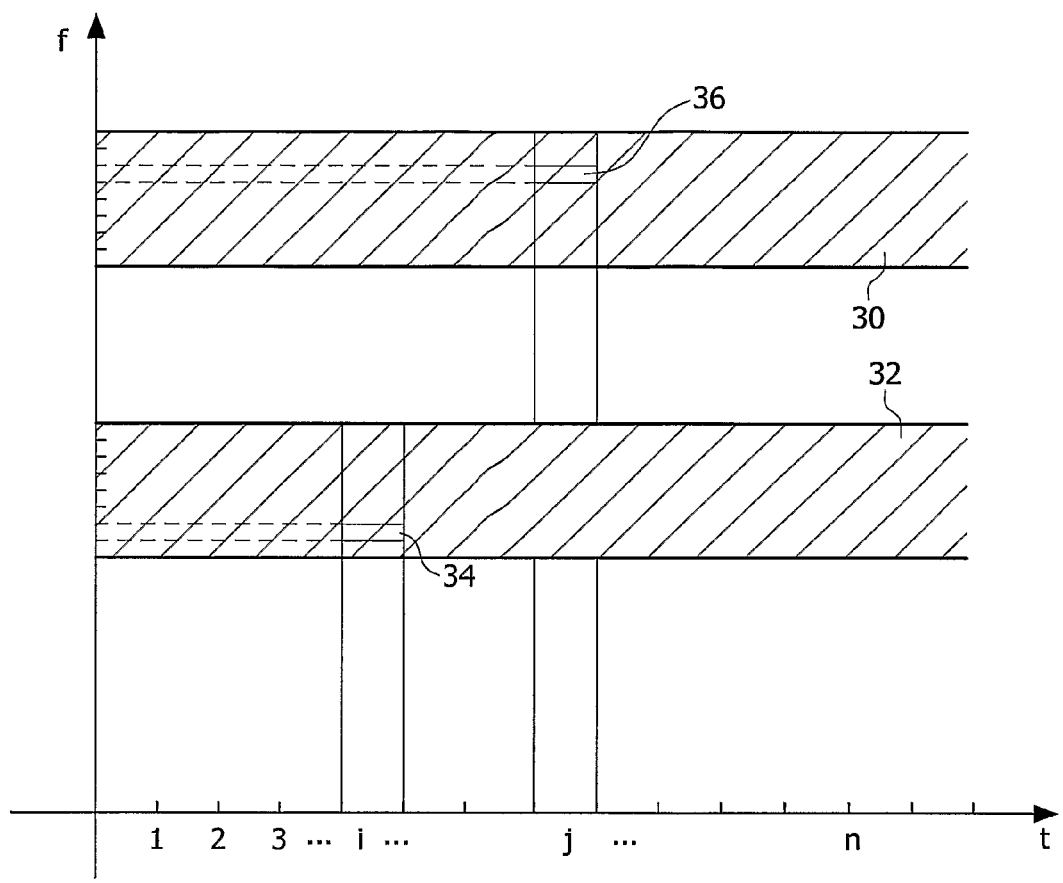

FIG. 2 exemplifies the assignment of first and second frequency channels and time slots for data transmission according to the preferred embodiment.

FIG. 1 shows a device for transmitting data packets according to the preferred embodiment of the present invention. Said device comprises a transceiver 10 as well as an antenna 12. The transceiver and antenna are adapted to transmitting by a transmitter 22 and receiving radio waves in the 2.4 GHz as well as the 5.8 GHz ISM band by the antenna. The transceiver comprises an interference signal detector 14. The interference signal detector is adapted to count the number of transmission errors in each time slot and frequency channel. If the number of errors in a given time slot exceeds a predetermined threshold value, the presence of an interferer signal during the time slot is detected. The frequency channels disturbed during said time slot are determined by the interference signal detector. A compiler 18 is connected to the interference signal detector. The compiler 18 lists the frequency channels affected by interference (interference channels).

A calculator 16 connected to the interference detector 14 calculates the average duration of the interference signal. The average duration is expressed by the number of consecutive time slots occupied by an interferer. A designator 20 is connected to the calculator 16 and the compiler 18 and the designator 20 is coupled to the antenna 12 via the transmitter 22. The designator 20 is adapted to designating time slots and frequency channels to the data packets that are to be transmitted by the transmitter 22. If interference signals are detected on a data link, the designator designates two frequency channels for transmission to a single data packet. The two frequency channels are located in the 2.4 GHz ISM and the 5.8 GHz ISM band.

The frequency channels are designated such that they are not listed by the compiler. The time slots for the data packet are separated by a duration greater than the average duration of the interference signals.

FIG. 2 shows an example for the designation of two time slots and frequency channels for transmission of the single data packet. The x-axis in the coordinate system shown in FIG. 2 denotes the time t. The time t is divided into a number of consecutive time slots 1, 2, 3, ..., n. The y-axis in FIG. 2 denotes the frequency. Two frequency bands are indicated by two horizontal bars 30 and 32. Both the 2.4 GHz frequency band 32 as well as the 5.8 GHz frequency band 30 are divided into a number of frequency channels. Each information packet is transferred within one particular time slot and frequency channel. In order to provide for a safe data transmission, data packets are transferred twice, once within the 2.4 GHz ISM band 32 once within the 5.8 GHz ISM band 30. A data packet 34 in FIG. 2 is transferred within a channel of the 2.4 GHz ISM band and within time slot i. The same data packet 36 is transferred within a frequency channel of the 5.8 GHz ISM band 30 and the time slot j. Since interference signals regularly occur only within one of the two frequency bands, one of the two data packets 30 and 32 will be transferred undisturbed.

What is claimed is:

1. A method for transmitting data packets over a wireless data link, the method comprising the steps: continually searching for interference signals on the data link, assigning a first frequency channel and a first time slot on the data link, wherein the first frequency channels lies within a first industrial scientific and medical (ISM) band, assigning a second frequency channel and a second time slot on the data link, wherein the second frequency channel lies within a second ISM Band, transmitting a data packet within the first time slot and the first frequency channel and within the second time slot and the second frequency channel, if the frequency of the interference signals lies within the first ISM or the second ISM band.

2. A method for transmitting data packets over a wireless data link according to claim 1, further comprising the steps: continually detecting a duration of interference signals, determining an average duration of the interference signals, assigning the first and second time slots in such a way that the second time slot is separated in time from the first time slot by a duration greater than the average duration of the interference signals.

3. A method for transmitting data packets over a wireless data link according to claim 1, further comprising the steps: creating a list of interfered frequency channels and assigning the first and/or second frequency channels in such a way, that they do not overlap the interfered frequency channels of the list.

4. A method for transmitting data packets over a wireless data link according to claim 1, wherein the data link is subject to periodic bursts of interference comprising the steps: detecting a presence of periodic bursts of interference determining when a periodic burst will appear, selecting the first or the second time slot in such a way that an interference burst does not occur during the selected time slot, transmitting the data packet on the selected time slot.

5. A device for transmitting data packets over a data link, comprising: an interference signal detector adapted to continually detect a frequency of interference signals on the data link, designator adapted to assign a first frequency channel and a first time slot on the data link, wherein the first frequency channels lies within a first industrial scientific and medical (ISM) band, and adapted to assign a second frequency channel and a second time slot on the data link, wherein the second frequency channel lies within a second ISM Band, transmitter adapted to transmit each data packet within the first time slot and the first frequency channel and within the second time slot and the second frequency channel, if the frequency of the interference signals lies within the first or the second ISM.

6. A device for transmitting data packets over a data link according to claim 5, further comprising: calculator adapted to determine an average duration of the interference signals, wherein the interference signal detector is adapted to continually detect a duration of the interference signals, the designator is adapted to assign the first and second time slots in such a way that the second time slot is spaced in time from the first time slot by a duration greater than the average duration of the interference signals.

7. A device for transmitting data packets over a data link according to claim 5, further comprising: a compiler adapted to list interfered frequency channels wherein said designator is adapted to assign the first and/or second frequency channels in such a way, that they do not overlap the interfered frequency channels.

8. A device for transmitting data packets over a data link according to claim 5, wherein the interference signal detector is adapted to detect a presence of periodic bursts of interference, the calculator is adapted to determine an average duration of the interference signals and determine when a periodic burst will appear, and the selector being adapted to select the first or second time slot in away such that an interference burst does not occur during the selected time slot.

* * * * *